(12) United States Patent
Webb

(10) Patent No.: US 6,943,787 B2
(45) Date of Patent: *Sep. 13, 2005

(54) SYSTEM AND METHOD FOR DISPLAYING IMPLANTABLE MEDICAL DEVICE DATA

(75) Inventor: James D. Webb, Maple Grove, MN (US)

(73) Assignee: Medtronics, Inc., Minneapolis, MN (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/057,173

(22) Filed: Jan. 25, 2002

(65) Prior Publication Data

US 2002/0154111 A1 Oct. 24, 2002

Related U.S. Application Data

(60) Provisional application No. 60/271,775, filed on Feb. 27, 2001.

(51) Int. Cl.$^7$ .............................................. G06T 17/00
(52) U.S. Cl. ......................... 345/418; 128/899; 607/30
(58) Field of Search .......................... 345/418; 607/30; 128/899

(56) References Cited

U.S. PATENT DOCUMENTS

| | | | |
|---|---|---|---|
| 5,535,752 A | 7/1996 | Halperin et al. ............ 128/670 |
| 5,564,434 A | 10/1996 | Halperin et al. ............ 128/748 |
| 6,250,309 B1 * | 6/2001 | Krichen et al. ............. 128/899 |
| 6,654,734 B1 * | 11/2003 | Mani et al. ..................... 707/2 |
| 2002/0129129 A1 * | 9/2002 | Bloch et al. ................ 709/220 |
| 2002/0143823 A1 * | 10/2002 | Stevens ...................... 707/523 |

OTHER PUBLICATIONS

McCathieNevile, "Accessibility Features of SVG" Aug. 7, 2000.*

* cited by examiner

*Primary Examiner*—Kimbinh T. Nguyen
(74) *Attorney, Agent, or Firm*—Girma Wolde-Michael; Michael C. Soldner

(57) ABSTRACT

A system and method for displaying implantable medical device data that includes translating means for translating data written in a first predetermined format that is not compatible with SVG-formatted data into SVG-formatted data, and formatting means for receiving the SVG-formatted data and for providing a user-comprehensible representation of the SVG-formatted data. In this way, session data is converted from a first format to a second format, and the converted session data is rendered to enable multiple display and control of the converted session data so that the rendered data is displayed using the multiple display and layout control to provide a user with multiple display of a single set of session data.

18 Claims, 1 Drawing Sheet

SYSTEM AND METHOD FOR DISPLAYING IMPLANTABLE MEDICAL DEVICE DATA

RELATED APPLICATIONS

This application claims priority and other benefits from U.S. Provisional Patent Application Ser. No. 60/271,775, filed Feb. 27, 2001, entitled "SYSTEM AND METHOD FOR USING SCALABLE VECTOR GRAPHICS TO DISPLAY IMPLANTABLE DEVICE DATA".

FIELD OF THE INVENTION

This invention relates to a system for displaying data collected from implantable medical devices for diagnosis and therapy purposes; and, more particularly, relates to a system and method of using scalable vector graphics to display the implantable medical device data.

BACKGROUND OF THE INVENTION

Many Implantable Medical Devices (IMDs) collect and store patient data. For example, devices that are adapted to deliver electrical stimulation to a patient for pacing and cardioversion/defibrillation purposes often store data associated with a patient's heart beat. This data can be analyzed by a physician to assess patient health and/or to modify or initiate therapy. Pacing and defibrillation devices may also store information related to blood pressure, heart contractibility, blood chemistry, body temperature, and a host of other physiological indicators that are measured by sensors placed within a patient's body and coupled to the IMD.

Some IMDs do not delivery therapy, and are provided solely to collect and store patient data. For example, the MEDTRONIC Chronicle™ Implantable Hemodynamic Monitor (IHM) employs the leads and circuitry disclosed in commonly-assigned U.S. Pat. Nos. 5,535,752 and 5,564,434 to store EGM and absolute blood pressure values. This data is stored within internal memory within the implantable device, and is periodically transmitted to an external device such as a programmer to be diagnosed by a physician.

Data transferred from an IMD to an external device may be displayed in real-time, and is often also stored for later use and display. If desired, the stored data may be manipulated and processed to obtain further physiological information that may also be displayed.

Physiological data is commonly displayed in a graphical format. One example of a device for graphically displaying data retrieved from an IMD is the Model 9760 programmer manufactured by Medtronic, Inc., Minneapolis, Minn. The Model 9760 programmer is based on a general-purpose microprocessor platform and includes a text and graphics display screen similar to that conventionally used with personal computers. The graphics display screen allows graphical depictions that may include real-time ECG waveform displays. Additionally, the event markers associated with various physiologic and pacing events detected by an IMD can be superimposed upon, or displayed alongside of, the ECG signal.

The display of graphical data collected from an IMD presents several challenges. First, no suitable industry standard is available for the display of such data. As a result, devices are generally equipped with display software that is specifically tailored to the application. The software generally requires a large amount of time and money to implement, and must be supported by a compatible graphics library. Moreover, such software packages must be distributed, installed, and maintained.

One alternative approach to custom software involves the use of web-based viewing software. Such software can be downloaded from a web site to a user system. Since the software is maintained on a central site, costs associated with maintenance and distribution of the software are reduced. However, problems still exist with these types of display systems. For example, the software packages downloaded from a web site must be written in the local language of the new host system. This means that multiple versions of the software must be developed and maintained on the website. This is expensive and cumbersome. Additionally, web-based graphics applications are generally associated with large GIF, JPEG, or PNG files, making them time-consuming to download and execute. Generally, these formats utilize a "one-size-fits-all" approach such that the file size cannot be reduced to take advantage of a smaller application. Finally, current web-based display systems force the user to employ separate views when printing as compared to on-line viewing to control page formatting and to take advantage of printer resolution. The increases development expenses, and is inconvenient to use, requiring the user to execute additional steps to complete a task.

What is needed, therefore, is a high-speed, easy-to-use, system for displaying data collected from implantable medical devices that addresses the drawbacks set forth above, and other disadvantages of prior art systems.

SUMMARY OF THE INVENTION

The present invention is directed to providing an improved system for displaying data collected from implantable medical devices. According to the present invention, a system for displaying implantable medical device session data includes translating means for translating data written in a first predetermined format that is not compatible with SVG-formatted data into SVG-formatted data, and formatting means for receiving the SVG-formatted data and for providing a user-comprehensible representation of the SVG-formatted data.

According to the present invention, a system to manage medical session data, includes a processing circuit to convert the medical session data from an XML format to an SVG format, and a device to utilize the medical session data translated into the SVG format to generate viewable data. According to yet another embodiment of the present invention, a method of displaying session data in an implantable medical device system, includes converting the session data from a first format to a second format; rendering the converted session data to enable multiple display and control of the converted session data, and displaying the rendered data using the multiple display and layout control to provide a user with multiple display of a single set of session data.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE INVENTION

Figure 1:
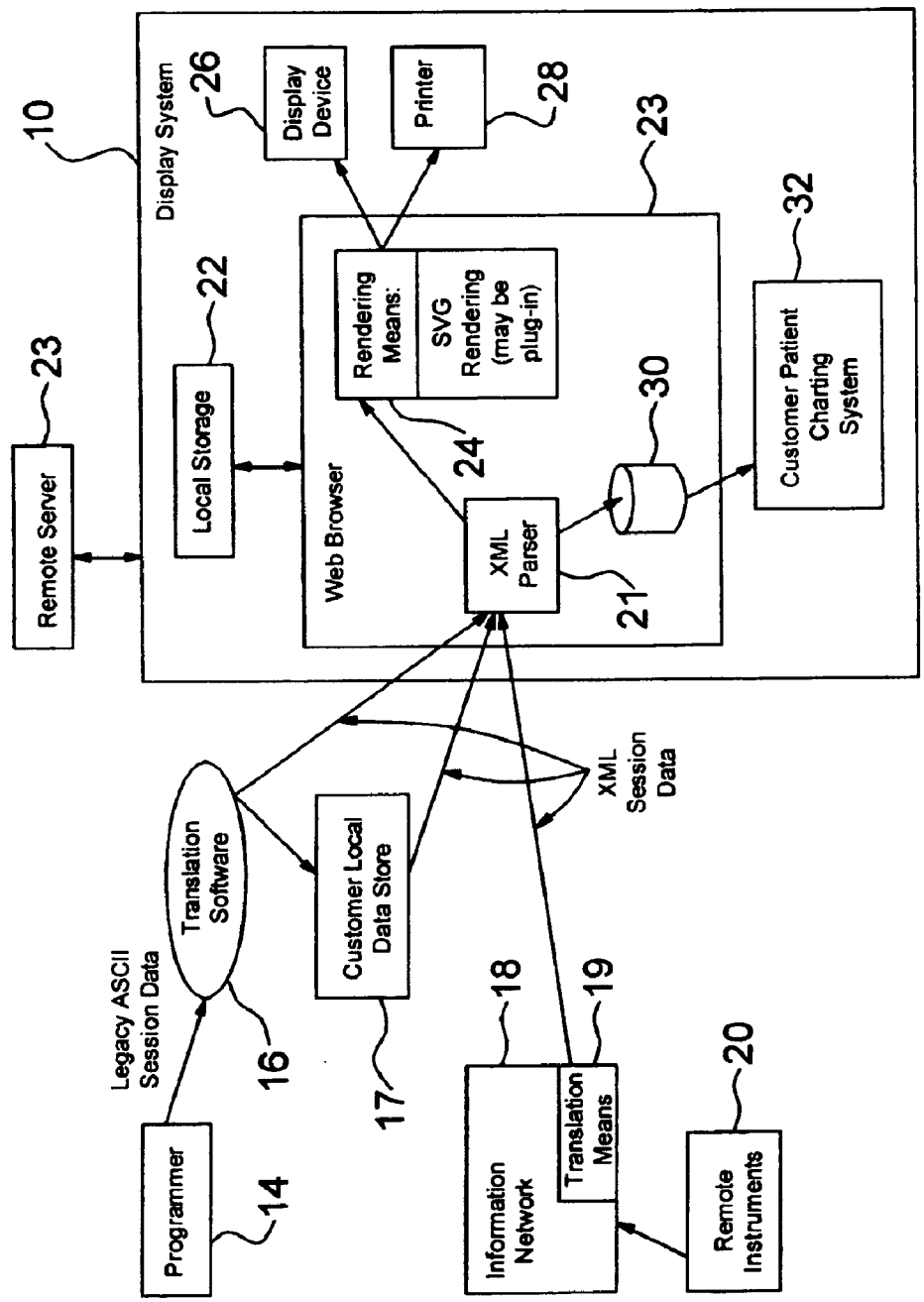
FIG. 1 is a block diagram of a display system, according to the present invention, for displaying session data received from an implantable medical device.

The current invention provides an improved system for displaying data collected from implantable medical devices.

The system is implemented using the scalable vector graphics (SVG) language. This language is a high-performance vector graphics format that, unlike other graphic formats such as GIF or JPEG, stores text as strings. These strings can be readily translated as the data is downloaded using XSLT style sheets. This allows users to choose a display language at the time data is viewed. The user is not forced to view the data using a tool written in the language in which the data was stored. Moreover, the user may view data sets in multiple ways depending on the selection of the style sheets. Since text and graphics are stored as separate elements, a single set of data can be displayed in multiple ways (by using SVG commands in style sheets transformations). Thus, views may be customized for different products, users, or display devices.

The current system provides other important benefits over prior art display systems. Because style sheets are used to transform data sets, development costs may be dramatically reduced. This is because style sheets are much less expensive to develop than typical transformation software. Additionally, the current system readily supports re-sizing, zooming, scrolling, calipers, and the moving of any graphics and/or text portion a display without the use of custom software. For example, graphics and/or text data may be positioned using "drag-and-drop" functions. Any graphics and/or text data may be independently enlarged in size, or alternatively reduced, without affecting other elements within the display screen. Various backgrounds may be selected as the back-drop for displayed data, including grid and graph backgrounds. Printing is automatically selected to match the resolution of an attached printer so that displayed views are printed using the highest-possible resolution. Animation capabilities allow waveform data to be scrolled across the screen provide a "real-time" effect.

Because of the various advantages described above, the current system is ideally suited for the display and reporting of all types of diagnostic and therapy-based information including physiological parameters, measurements, chart information, prescription information, and test results including ECG waveform information and other waveform data. X-rays, fluoroscopic images, and other image data may also be viewed using the inventive display design.

Since the current invention is programmed using the SVG language and data format, data files are substantially reduced in size as compared to equivalent GIF, JPEG or PNG files. Additionally, the file sizes may be customized to meet the demands of a specific application. This allows data sets to be downloaded in a fraction of the time of GIF or JPEG files. Moreover, fewer storage resources must be allocated to retain data, and data sets may be processed and displayed more quickly.

Because of the above-described benefits associated with the inventive system, the current design provides an optimal way to display session data, which may be received from a large array of devices including information networks, in-home remote monitoring systems, extenders, programmers, and third-party charting systems. Other scopes and aspects of the inventive system will become apparent from the following detailed description of the invention and the accompanying drawings.

FIG. 1 is a block diagram of a display system, according to the present invention, for displaying session data received from an implantable medical device. As illustrated in FIG. 1, a display system 10 includes a processing circuit, which may be a microprocessor or other type of processing circuit operating under software, firmware, and/or hardware control. Display system 10 receives session data from any number of sources. For example, session data may be received directly from one or more programmers 14. If the data is in a legacy format such as ASCII text, this data may be translated to XML format using translation software 16 prior to being forwarded to display system 10. Other sources of data include, for example, a data store 17 residing at a client site such as a clinic or other health-care provider, in addition to information networks 18 which may receive the data from remote instruments 20 such as in-home remote monitors (IRMs), extenders, other programmers, backend systems, or via user entry. The information networks 18 may include translation means 19 that is similar to translation software 16 to translate any of the data received from the remote instruments 20 from a legacy format to an XML format.

Display system 10 may include means to translate the received session data from XML format to SVG format. In FIG. 1, this is shown as an XML parser 21. Parser 21 may be the parser included in a system's web browser 23, or alternatively, may be a separate browser specifically provided for this purpose. When XML data is received, parser 21 may use XSLT style sheets or client-side software such as javascript to transform the session data to SVG format. The XSLT style sheets may be stored in local storage 22, or on a remotely-located server 23.

It may be noted that the above-described embodiment contemplates a system that first converts data to XML format, and finally to a SVG format. In an alternative embodiment, translation software 16 translates data directly from a legacy format to an SVG format. In this embodiment, the XML parser 21 is not necessary.

After being transformed to SVG format, the data may be rendered into a web page by rendering means shown in block 24. This rendering means 24 may be a SVG browser plug-in, or a stand-alone SVG display engine. The rendering means 24 may utilize smoothing and averaging schemes to provide a high-resolution display from low-resolution session data.

Once the data has been rendered into a web page, the data may be viewed on any display device 26 that supports SVG. Alternatively, the user can print the data using one or more printers 28 accessible to the system. Formatting of the printed material may be managed using print controls provided by the SVG viewer or browser, as discussed above. SVG session data can also be stored in a file or stream 30. This file is a compact, displayable representation of a session record that can later be provided to a customer patient charting system 32 (on-line record system) that supports SVG-formatted records.

The use of scalable vector graphics for display of diagnostic, waveform and other session data according to the present invention provides an enhanced means for displaying the session data from devices, including information networks, IRMs, extenders, programmers, and third party charting systems. The present invention contemplates the display of both text and graphics data to be displayed with scalable vector graphics, including traditional session data such as diagnostic data and waveforms, ECG, parameters, measurements and test results, along with other nontraditional data such as patient data, medications, patient chart information such as patient conditions, x-rays, fluoroscopy images, and so forth.

The use of scalable vector graphics in implantable medical device systems according to the present invention reduces the disparity in paper and screen resolution of session data display by providing, for example, a one page/view report that defaults to a summary view designed that a user is able to print (or zoom into) to get at desired supporting detail. The present invention removes the necessity for separately designed views (printer versus display, summary versus detail, etc,), including the burden on the user to be able to navigate between them. Furthermore, by enabling compact and displayable representation of session records, the present invention provides a means for direct input of session data within a customer's charting system, so that once a patient's device session record is selected, the stored scalable vector graphics is displayed. As a result, interfaces to other customer systems are enabled without dealing with the issues of interchange standards and data transformations. Furthermore, it is envisioned that scalable vector graphics can be used to tailor displays to different devices, including palm devices, personal computers, next generation cell phones, and so forth.

The use of scalable vector graphics in implantable medical device systems according to the present invention enables the use of small file sizes, resizable elements and groups of elements, such as resizing of individual waveforms, movable elements and groups of elements, such as dragging waveforms along with their controls and labels, high resolution printing, improved zooming and panning, use of animation to "play back" waveforms, use of tiling filter for a background chartpaper-like grid, and use of smoothing and averaging schemes for display of high resolution in low resolution views.

The preceding specific embodiments are illustrative of the practice of the invention. It is to be understood, therefore, that other expedients known to those of skill in the art or disclosed herein may be employed. In the following claims, means-plus-function clauses are intended to cover the structures described herein as performing the recited function and not only structural equivalents but also equivalent structures. For example, although a nail and a screw may not be structural equivalents in that a nail employs a cylindrical surface to secure wooden parts together, whereas a screw employs a helical surface, in the environment of fastening wooden parts, a nail and a screw are equivalent structures. It is therefore to be understood, that within the scope of the appended claims, the invention may be practiced otherwise than as specifically described without actually departing from the spirit and scope of the present invention.

What is claimed is:

1. A system for displaying implantable medical device session data, comprising:
   translating means for translating data written in a first predetermined format that is not compatible with SVG-formatted data into SVG-formatted data; and
   formatting means for receiving the SVG-formatted data and for providing a user-comprehensible representation of the SVG-formatted data; wherein the formatting means includes a file for storing the SVG-formatted data and a customer patient charting system for receiving and displaying the SVG-formatted data.

2. The system of claim 1, wherein the formatting means is means for rendering the SVG-formatted data into a web page.

3. The system of claim 2, wherein the means for rendering is an SVG browser plug-in.

4. The system of claim 3, wherein the means for rendering is an SVG display engine.

5. The system of claim 1, wherein the translating means includes means for translating data from the first predetermined format into an XML format.

6. The system of claim 5, wherein the translating means further includes an XML parser.

7. The system of claim 6, wherein the XML parser is a web browser.

8. The system of claim 1, wherein the formatting means includes a display device.

9. The system of claim 1, wherein the formatting means includes a printing device.

10. The system of claim 1, wherein the translating means includes means for translating the data written in the first predetermined format directly into SVG-formatted data.

11. A system manage medical session data, comprising:
    a processing circuit to convert the medical session data from an XML format to an SVG format; and
    a device to utilize the medical session data translated into the SVG format to generate viewable data.

12. The system of claim 11, and further including means to translate the medical session data from a legacy format into the XML format, and to provide the translated data to the processing circuit.

13. The system of claim 11, and further including an information network coupled to provide the medical session data in the XML format to the processing circuit.

14. The system of claim 13, wherein the information network includes translation means to translate the medical session data from a legacy format to the XML format.

15. The system of claim 14, wherein the information network is coupled to one or more devices selected from the group consisting of in-home remote monitors (IRMs), extenders, programmers, and backend systems.

16. A method of displaying session data in an implantable medical device system, comprising the steps of:
    converting the session data from a first format to a second format;
    rendering the converted session data to enable multiple display and control of the converted session data; and
    displaying the rendered data using the multiple display and layout control to provide a user with multiple display of a single set of session data.

17. The method of claim 16, wherein the first format is an XML format and the second format is an SVG format.

18. The method of claim 16, wherein the step of displaying includes re-sizing, zooming, scrolling use of calipers, and the moving of one of graphics and text portions of the display without the use of custom software.

* * * * *